United States Patent [19]

King et al.

[11] Patent Number: 5,223,033
[45] Date of Patent: Jun. 29, 1993

[54] PASTE FORMULATIONS FOR USE IN THE ELECTRONICS INDUSTRY

[75] Inventors: Charles E. King; Andrew C. Mackie; Geoffrey A. Paterson, all of Oxford, United Kingdom

[73] Assignee: Cookson Group PLC, London, United Kingdom

[21] Appl. No.: 860,230

[22] Filed: Apr. 27, 1992

Related U.S. Application Data

[63] Continuation-in-part of Ser. No. 717,480, Jun. 19, 1991, abandoned.

[30] Foreign Application Priority Data

Jul. 2, 1990 [GB] United Kingdom ............... 9014676

[51] Int. Cl.$^5$ .................. C09D 5/24; C09D 5/38; C23C 24/08
[52] U.S. Cl. .................. 106/285; 106/1.05; 106/1.19; 148/23; 148/24; 148/25; 252/512; 252/514
[58] Field of Search .................. 106/1.05, 1.19, 266, 106/285; 148/23, 24, 25; 252/512, 514

[56] References Cited

U.S. PATENT DOCUMENTS

Re. 32,309 12/1986 Hwang .................. 148/23
4,369,063 1/1983 McGowan, Jr. .................. 106/1.14

Primary Examiner—David Brunsman
Attorney, Agent, or Firm—Watson, Cole, Grindle & Watson

[57] ABSTRACT

In a paste for use in the electronics industry. which comprises:
i) a non aqueous vehicle; and
ii) a particulate filler material, the improvement which comprises the vehicle being a stable emulsion of at least two immiscible organic liquids of at least 50% by volume disperse phase, one of which liquids is selected from the group consisting of a polar solvent and a mixture of polar solvents, and the other of which liquids is selected from the group consisting of an aliphatic hydrocarbon and a mixture of aliphatic hydrocarbons and the paste, when heated to remove the vehicle therefrom yields less than 3.0% by weight of organic residues based on the weight of the paste.

12 Claims, No Drawings

PASTE FORMULATIONS FOR USE IN THE ELECTRONICS INDUSTRY

CROSS REFERENCE TO RELATED APPLICATIONS

This application is a continuation-in-part of application Ser. No. 717,480, filed Jun. 19, 1991, now abandoned.

BACKGROUND OF THE INVENTION

The present invention relates to paste formulations for use in the electronics industry and, in particular, to solder paste formulations in which an emulsion of two or more immiscible organic liquids is used as a vehicle for a suitable inorganic filler material.

Vehicles which are commonly used in the preparation of pastes for the electronics industry contain a volatile solvent, a thickener/binder, a rheological modifier to enhance thixotropy or pseudoplasticity, a surfactant and, optionally, an activating or reducing agent. In particular, reducing or fluxing agents may be used where surface preparation or fluxing is necessary. The level of non-volatile organic solids to provide the desired viscosity is normally from 40 to 75 wt %. The materials used are either polymeric materials, such as ethyl cellulose or derivatives thereof, polyamides or castor oil derivatives. There is a trend in the electronics industry towards the automated manufacture of printed circuit boards (pcb's), where residues after a soldering operation are required to be minimal, and a subsequent cleaning operation is obviated. The solids content of the vehicle/flux for conventional solder pastes used in pcb manufacture is typically 40 to 80 wt % and much of this will remain after solder reflow, requiring a cleaning operation. Furthermore some solder paste vehicles with a high solids content have poor hot slump characteristics; this can lead to solder powder being washed away from the printed circuit pad during reflow. Discrete solder balls are then produced and these may lead to short circuits.

We have now developed a paste for use in the electronics industry which uses a vehicle which has a low, typically less than 3.0% by weight organic solids content based on the paste and good hot slump characteristics.

Accordingly, the present invention provides a paste for use in the electronics industry which comprises:
i) a non aqueous vehicle; and
ii) a particulate filler material, the improvement which comprises the vehicle being a stable emulsion of at least two immiscible organic liquids of at least 50% by volume disperse phase, one of which liquids is selected from the group consisting of a polar solvent and a mixture of polar solvents, and the other of which liquids is selected from the group consisting of an aliphatic hydrocarbon and a mixture of aliphatic hydrocarbons and the paste, when heated to remove the vehicle therefrom yields less than 3.0% by weight of organic residues based on the weight of the paste.

The vehicle which is used in the pastes of the present invention is a stable nonaqueous dual or multiphase emulsion. The disperse phase will comprise the major volume fraction of the emulsion and contain between 50 vol% and 85 vol%, more preferably 55 vol% and 80 vol%. The continuous phase of the emulsion will substantially govern the rheological behaviour of the emulsion as a whole and thus, if the continuous phase has a high viscosity, then this characteristic will be imparted to the emulsion vehicle.

One of the immiscible organic liquids used to form the emulsion is a polar organic solvent, such as a glycol. The other of the immiscible organic liquids is an aliphatic hydrocarbon, such as a mineral oil. Mixtures of polar organic solvents or aliphatic hydrocarbons may be used, as appropriate. Preferably both the polar organic solvent, or mixture thereof, and the aliphatic hydrocarbon, or mixture thereof, will have a lower boiling point greater than 100° C.

An emulsifier is used to form the emulsion from the immiscible liquids and generally will be present in an amount of from 0.2 to 10 wt %, based on the total weight of the vehicle. Suitable emulsifiers are poly(oxyalkylene)alkyl ethers, amine derivatives of oligomeric polyesters, or similar compounds.

The vehicle may additionally contain a co-solvent, which is included in order to improve surface tension parameters, in an amount of up to 20 vol%. A suitable co-solvent is a $C_1$–$C_{10}$, chain length, aliphatic alcohol.

The vehicle may additionally include a thickener, which should be chosen so as to be compatible with either the continuous phase or the disperse phase, in an amount of up to 30 wt %. Suitable thickeners include polyacrylic acid or polyamides or resins for the polar fraction and hydrogenated castor oil, aliphatic and non polar resins for the aliphatic fraction. The viscosity of the continuous phase is increased by the inclusion of a thickener and this enables the rheological characteristics of the vehicle to be adapted as required.

It may be necessary for further components to be added to the vehicle to provide, for instance, fluxing activity for solder reflow. Typical fluxing additives, familiar to those skilled in the art, may be used and may also aid the emulsion stability. Activators used in the preparation of solder paste will be included in amounts up to 7 wt %. Other additives may include tackifier(s) and/or antioxidant(s) at a level of less that 5 wt %.

The vehicle as described will form a paste when blended with suitably sized particulate material and may be conveyed to a substrate by a variety of processing techniques used in hybrid microelectronics and pcb manufacture, for example by screen or stencil printing, dispensing or dipping. The particular application technique will depend upon the nature of the article being produced. The nature of the particulate material, which is preferably an inorganic particulate material incorporated into the paste will depend upon the intended application of the paste. For example, solder powders of different alloy compositions, e.g. SnPb such as 63 Sn:37Pb, SnPbBi, SnBi etc. of a particle size less than 80 micrometres, may be used to form solder pastes. A paste for manufacturing multilayer capacitors may comprise a palladium/silver powder as the filler.

The ratio of the emulsion vehicle to the inorganic particulate material will depend upon various factors including the particle size/ morphology of the particulate material and the intended use of the paste. Generally, however, a greater quantity of the emulsion vehicle will be required for the production of pastes containing fine particulate material having an average particle size of up to about 5 micrometres. Present day, solder pastes, however, are usually prepared from particulate material having an average particle size in excess of 10 micrometres.

The pastes of the present invention contain substantially lower levels of organic solids than those systems conventionally used.

Solder pastes made with an emulsion vehicle as described herein, are reflowable using e.g. vapour phase systems or infra-red reflow and yield low organic residues, typically less than 3.0% by weight and more preferably less than 2.5% by weight based on a solder paste containing 90% by weight solder powder when reflowed at a temperature of up to 270° C. Dependent on resin levels the systems are reflowable in either air or nitrogen atmospheres, and the residues may be left on the printed circuit board.

The present invention will be further described with reference to the following non-limiting Examples.

EXAMPLE 1

An emulsion vehicle was prepared by mixing the following materials together, with heating:

| | Weight |
|---|---|
| 1% w/w 0.75 M M.W. polyacrylic acid in ethylene glycol | 26.61 g |
| succinic acid | 0.5 g |
| pentan-1-ol | 0.81 g |
| Brij 99 (a nonionic surfactant produced by ICI) | 1.00 g |
| Shellsol D90 (an aliphatic hydrocarbon produced by Shell Chemicals) | 59.7 g |

At 40° C. a viscous emulsion was produced. The disperse volume fraction was 75%. The emulsion vehicle was admixed with a solder powder (63:37 tin:lead w:w) having a particle size in the range of from 25 to 45 $\mu$m in a weight ratio of 8:92 emulsion:solder. A screen-printable solder paste was produced. When reflowed in a nitrogen atmosphere this solder paste gave an organics residue of 0.16 wt %.

EXAMPLE 2

An emulsion vehicle was prepared by mixing the following materials together, with heating:

| | Weight |
|---|---|
| 0.75% w/w 1.25 M M.W. polyacrylic acid in ethylene glycol | 66.5 g |
| pentan-1-ol | 2.0 g |
| Brij 99 | 2.5 g |
| Shellsol D90 | 148.9 g |
| triethanolamine | 4.4 g |
| diethanolamine hydrobromide | 4.4 g |

At 40° C. a viscous emulsion was produced. The disperse volume fraction was 73%. This emulsion was used to prepare a solder paste in the manner as described in Example 1. A screen-printable material was obtained. When reflowed in a nitrogen atmosphere this solder paste gave an organics residue of 0.41 wt %.

EXAMPLE 3

An emulsion vehicle was prepared by mixing the following materials together, with heating:

| | Weight |
|---|---|
| 0.5% w/w 5 M-6 M M.W. polyacrylamide in ethylene glycol | 27.0 g |
| pentan-1-ol | 0.81 g |
| Brij 99 | 1.0 g |
| Shellsol D90 | 59.7 g |
| diethanolamine hydrobromide | 2.0 g |

At 40° C. a viscous emulsion was produced. The disperse volume fraction was 74%. This emulsion was used to prepare a solder paste in the manner as described in Example 1. A screen-printable material was obtained. When reflowed in a nitrogen atmosphere this solder paste gave a organics residue of 0.28 wt %.

EXAMPLE 4

An emulsion vehicle was obtained by mixing the following materials together, with heating:

| | Weight |
|---|---|
| Polyterpene resin | 15 g |
| Mineral Spirits | 15 g |
| Polyisobutylene | 0.098 g |
| Dipropylene glycol | 52.8 g |
| Propylene glycol | 52.8 g |
| Hypermer KD3 surfactant | 1.5 g |
| $\beta$-alanine hydrochloride | 0.25 g |

At 40° C. an emulsion was formed which was used to prepare a solder paste in the manner described in Example 1. The disperse volume fraction was 71%. A screen printable material was obtained. Satisfactory reflow characteristics were found when reflowed under a nitrogen atmosphere. The organics residue was 0.98 wt %.

EXAMPLE 5

| | Weight |
|---|---|
| Shellsol D90 | 20 g |
| Polyisobutylene | 0.8 g |
| Propane 1-2 diol | 77.7 g |
| Hypermer KD3 surfactant | 1 g |
| Diethanolamine hydrobromide | 1 g |
| Hercules Staybelite resin | 25 g |

An emulsion was prepared from the above components as in Example 3. The disperse volume fraction was 77.5%. A solder paste was prepared as in Example 1. A screen printable solder paste was obtained which was reflowable in air. The organics residue was 1.77 wt.

EXAMPLE 6

An emulsion vehicle was prepared from the following components:

| | |
|---|---|
| Dipropylene glycol | 42.75 g |
| Hercules Resin B106 | 2.25 g |
| Hypermer KD3 | 0.75 g |
| Adipic acid | 2.25 g |
| Hercures C Resin | 7.5 g |
| Polyisobutylene | 0.05 g |
| Shellsol D90 | 7.45 g |

The above materials were mixed together, with heating to approximately 40° C., to produce a viscous emulsion vehicle. The volume ratio of the polar disperse phase to the apolar continuous phase was 71:29. The emulsion vehicle remained stable for a few months. 7.5 parts by weight of the emulsion vehicle was mixed with 92.5 parts by weight of a solder powder (63.37 tin: lead w:w) of size range 25–45μm. A screen-printable solder paste was formed which remained stable for 6 months. When reflowed in a nitrogen atmosphere this solder paste gave an organics residue of 1.6 wt % residues on the test board.

EXAMPLE 7

An emulsion vehicle was prepared from the following components:

| | |
|---|---|
| Dipropylene glycol | 22.58 g |
| Propylene glycol | 22.58 g |
| Hypermer KD3 | 0.75 g |
| Hypermer 261 | 0.75 g |
| Adipic acid | 1.83 g |
| Hercures C Resin | 7.5 g |
| Polyisobutylene | 0.05 g |
| Shellsol D90 | 7.45 g |

The above materials were mixed together, with heating to approximately 40° C., to produce a viscous emulsion vehicle. The volume ratio of the polar disperse phase to the apolar continuous phase was 70:30. The emulsion vehicle remained stable for 6 months. 8.0 parts by weight of the emulsion vehicle was mixed with 92.0 parts by weight of a solder powder (63:37 tin:lead w:w) of size range 25–45 μm. A screen-printable solder paste was formed which remained stable for 6 months. When reflowed in a nitrogen atmosphere this solder paste gave an organics residue of 1.4 wt % residues on the test board.

We claim:

1. In a paste for use in the electronics industry which comprises:
   i) a non aqueous vehicle; and
   ii) a particulate filler material, the improvement which comprises the vehicle being a stable emulsion of at least two immiscible organic liquids of at least 50% by volume disperse phase, one of which liquids is selected from the group consisting of a polar solvent and a mixture of polar solvents, and the other of which liquids is selected from the group consisting of an aliphatic hydrocarbon and a mixture of aliphatic hydrocarbons and the paste, when heated to remove the vehicle therefrom yields less than 3.0% by weight of organic residues based on the weight of the paste.

2. Paste according to claim 1 wherein the polar organic solvent is a glycol.

3. Paste according to claim 1 wherein the aliphatic hydrocarbon is a mineral oil.

4. Paste according to claim 1 which, when heated to remove the vehicle therefrom yields less than 2.5% by weight of organic residues based on the weight of the paste.

5. Paste according to claim 1 wherein the polar solvent and the aliphatic hydrocarbon each has a lower boiling point of >100° C.

6. Paste according to claim 1 wherein the vehicle contains 0.2 to 10 wt %, based on the total weight thereof, of an emulsifier.

7. Paste according to claim 6 wherein the emulsifier is a poly(oxyalkylene)alkyl ether.

8. Paste according to claim 1 wherein the vehicle includes a co-solvent in an amount of up to 20 vol%.

9. Paste according to claim 1 wherein the vehicle includes a thickening agent in an amount of up to 30 wt %.

10. Paste according to claim 1 for manufacturing multilayer capacitors in which the particulate material is a palladium/silver powder mixture.

11. Paste according to claim 1 which is a solder paste in which the particulate material is solder powder.

12. Paste according to claim 11 wherein the solder powder is selected from the group consisting of an alloy of tin, lead, bismuth and combinations thereof.

* * * * *